United States Patent Office 2,765,253
Patented Oct. 2, 1956

2,765,253

TERT.-BUTYLCYANOMETHYL CYANAMIDE AND PROCESS OF KILLING THRIPS THEREWITH

Peter L. de Benneville and Lawrence J. Exner, Philadelphia, Pa., assignors to Rohm & Haas Company, Philadelphia, Pa., a corporation of Delaware No Drawing. Application August 28, 1953, Serial No. 377,251

2 Claims. (Cl. 167—22)

This invention relates to tert.-butylcyanomethyl cyanamide, to a method for its preparation, and to a process of controlling thrips on plants by applying this compound thereto. This compound is distinguished from other alkyl cyanomethyl cyanamides by its peculiar and remarkable insecticidal efficiency against thrips.

Tert.-butylcyanomethyl cyanamide is prepared by reacting together tert.-butylamine, formaldehyde, and hydrogen cyanide, whereby N-tert.-butylaminoacetonitrile is formed, and reacting this compound with cyanogen chloride or bromide in the presence of an acceptor for hydrogen halide, such as an inorganic base or a strong organic base, such as an amine, including an excess of tert.-butylaminoacetonitrile. The first step is conveniently carried out in a solution containing alcohol and/or water or any inert organic solvent, including benzene, toluene, or naphtha. The order of addition of reactants is not important. Formaldehyde and tert.-butylamine may be first mixed and hydrogen cyanide added thereto, conveniently between 0° and 50° C. Alternatively, formaldehyde solution and hydrogen cyanide may be reacted in the presence of an alkaline catalyst, such as triethanolamine, whereby glycolonitrile is formed, and an aqueous solution, desirably containing 50% to 70% of glycolonitrile, is mixed with tert.-butylamine, desirably between 0° and 35° C. After time has been allowed for advancing the reaction, water is separated to give crude tert.-butylaminoacetonitrile. This may be used as obtained or purified by distillation. To the same end tert.-butylamine and hydrogen cyanide may be mixed and this mixture combined with formaldehyde.

The tert.-butylaminoacetonitrile is treated with cyanogen chloride or bromide in the presence of an acceptor for hydrogen halide. An inorganic base may be thus used, such as sodium carbonate or hydroxide, potassium carbonate or hydroxide, sodium or potassium bicarbonate, or calcium hydroxide. Organic bases may likewise be used, conveniently an excess of butylaminoacetonitrile. This reaction is most conveniently carried out in an inert organic solvent, such as benzene, toluene, or naphtha at temperatures between 0° and 75° C. The reaction product may be purified by separating salt and excess acceptor and removing water. Distillation may be used for further purification.

To 150 parts of tert.-butylamine was added 164 parts of aqueous 36.5% formaldehyde solution at 15°-20° C. over a period of 20 minutes with stirring. To the stirred mixture was then added 54 parts of anhydrous hydrogen cyanide over a period of one half hour at 15°-25° C. and the mixture was stirred for one and one half hours at room temperature. It was then added to 250 parts of benzene and the water layer separated. The water layer was extracted with an additional 85 parts of benzene and the benzene solution combined and distilled. After removal of solvent there was obtained 159 parts of N-tert.-butylaminoacetonitrile, boiling at 80°-84° C. at 1.4 mm. The analysis for nitrogen was 24.8% (calculated 25.0%). Parts herein are by weight.

To a solution of 66 parts of cyanogen chloride in 45 parts of benzene was slowly added with stirring at less than 25° C. a solution of 56 parts of the above aminonitrile in 30 parts of benzene. In alternating sequence, there was then added a solution of 34.5 parts of potassium carbonate in 50 parts of water followed by an additional 56 parts of tert.-butylaminoacetonitrile dissolved in 30 parts of benzene, and finally again a solution of 34.5 parts of potassium carbonate in 50 parts of water. All additions were made at less than 25° C. After addition was complete the reaction mixture was stirred for one hour with the temperature maintained at about 30° C. in initial stages with slight cooling. The precipitated salts were removed by filtration, the benzene layer separated and distilled to yield 118 parts of N-tert.-butyl-N-cyanomethylcyanamide, distilling at 129°-134° C./1.7 mm. This water-white liquid had the following characteristics: $n_D^{25}$, 1.4506;

$$d_{25}^{25}, 0.9742$$

percent N found 30.4, calculated $C_7H_{11}N_3$, 30.6. This compound has the structure

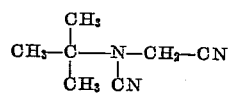

Tertiary butylcyanomethyl cyanamide is peculiarly effective as an agent for controlling thrips. For this purpose it may be extended with a solid carrier to form a dust or dissolved in an inert organic solvent, which, if desired, may be treated with an emulsifying agent. The emulsifiable concentrate can then be applied from aqueous sprays.

When tert.-butylcyanomethyl cyanamide was thus extended with a diluent and water and applied to foliage infested with greenhouse thrips, 100% kills were obtained at all concentrations from 1% down to 0.01%. Below this concentration kills were not quite complete. Even at 0.00001% control of thrips was above 95%. This degree of control may be contrasted with that obtained with Parathion, which gives 100% control at 0.00025% and 39% control at 0.0001%.

Parallel tests with methylcyanomethyl cyanamide gave only a 3% control of thrips at 0.1%, while with tert.-octylcyanomethyl cyanamide at 0.1% a control of 78% was obtained.

We claim:

1. A process for controlling thrips on plants which comprises applying to thrips on plants tert.-butylcyanomethyl cyanamide.

2. As a new compound, N-tert.-butyl-N-cyanomethyl cyanamide, having the formula

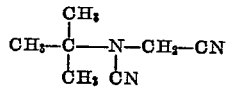

References Cited in the file of this patent

UNITED STATES PATENTS 2,589,208    Craig et al. _____ Mar. 18, 1952

OTHER REFERENCES

Von Braun: Ber. Deut. Chem., vol 40, pp. 3937–40 (1907).